(12) United States Patent
Kondo (10) Patent No.: US 7,358,719 B2
(45) Date of Patent: Apr. 15, 2008

(54) ROTATIONAL ANGLE DETECTOR

(75) Inventor: Seiji Kondo, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/733,924

(22) Filed: Apr. 11, 2007

(65) Prior Publication Data

US 2007/0252590 A1    Nov. 1, 2007

(30) Foreign Application Priority Data

Apr. 27, 2006   (JP) .............................. 2006-124102

(51) Int. Cl.
*G01B 7/30*   (2006.01)

(52) U.S. Cl. .............................................. 324/207.25

(58) Field of Classification Search ............ 324/207.25
See application file for complete search history.

(56) References Cited

U.S. PATENT DOCUMENTS

| 6,507,188 B1 | 1/2003 | Dilger et al. |
| 7,215,114 B2 * | 5/2007 | Takuma ................. 324/207.25 |

2007/0146169 A1   6/2007   Otsuka et al.

FOREIGN PATENT DOCUMENTS

| EP | 1445173 | * | 3/2004 |
| EP | 1445173 A2 | | 11/2004 |
| JP | 2004-177154 A | | 6/2004 |
| JP | 2004-184326 A | | 7/2004 |
| JP | 2004-309222 A | | 11/2004 |
| JP | WO2005/043089 | * | 12/2005 |
| WO | 2005/043089 A1 | | 12/2005 |
| WO | 2005043089 A1 | | 12/2005 |

* cited by examiner

*Primary Examiner*—Reena Aurora
(74) *Attorney, Agent, or Firm*—Crompton, Seager & Tufte, LLC

(57) ABSTRACT

A rotational angle detector for detecting the absolute value of a rotational angle of a rotor. The rotational angle detector includes a drive gear integrally rotatable with the rotor and first and second driven gears mated with the drive gear. First and second magnetic sensors detect the rotational angles of the first and second driven gears and output detection signals corresponding to the detected rotational angles. A controller calculates the absolute value of the rotational angle of the rotor based on the rotational angles of the first and second driven gears. Further, the controller detects an abnormality in the first or second magnetic sensor from the detection signals output by the first and second magnetic sensors.

6 Claims, 7 Drawing Sheets

ROTATIONAL ANGLE DETECTOR

CROSS-REFERENCE TO RELATED APPLICATIONS

This application is based upon and claims the benefit of priority from prior Japanese Patent Application No. 2006-124102, filed on Apr. 27, 2006, the entire contents of which are incorporated herein by reference.

BACKGROUND OF THE INVENTION

The present invention relates to a device for detecting the rotational angle of a rotor.

Various types of systems for improving traveling stability, such as a vehicle stability control system and an electronic control suspension system, are installed in recent vehicles. These systems execute control to stabilize the attitude of the vehicle in accordance with the steering angle of the steering wheel. The rotational angle of the steering wheel is detected by a rotational angle detector, which is incorporated in a steering column of the vehicle.

Japanese Laid-Open Patent Publication No. 2004-309222 describes an absolute angle detection type rotational angle detector, which detects the absolute value of the rotational angle (steering angle) of the steering wheel. The rotational angle detector includes a drive gear rotated integrally with the steering shaft and two driven gears mated with the drive gear. A magnet rotates integrally with each driven gear. The two driven gears have a different number of teeth. Due to the different number of teeth, the driven gears have different rotational angles when the drive gear rotates. The rotational angle detector includes two magneto-resistive elements MRE (FIG. 9) respectively arranged in correspondence with the two driven gears.

Each magneto-resistive element MRE provides a controller with a first analog signal and a second analog signal in correspondence with the rotational angle of the drive gear. The first analog signal is a sinusoidal wave signal, with each cycle of the sinusoidal wave corresponding to the rotation of the drive gear for a predetermined angle. The second analog signal is a cosine wave signal, with each cycle of the cosine wave corresponding to the rotation of the drive gear for a predetermined angle. The controller calculates the absolute value for the rotational angle of the drive gear from the first analog signal and the second analog signal. Thus, the controller readily obtains the present rotational angle when the power goes ON regardless of the steering wheel being rotated and changing rotational angle from the rotational angle detected when the power went off.

SUMMARY OF THE INVENTION

When a magneto-resistive element MRE fails to function normally (e.g., short circuiting occurs between adjacent pins), the defective magneto-resistive element MRE outputs a signal having a level differing from the level that would be obtained in a normal state. This would result in the calculation of an inaccurate rotational angle differing from the rotational angle that would be obtained in a normal state. An abnormality in the magneto-resistive element MRE that occurs when power is being supplied can be detected by comparing the difference of the previously and presently calculated rotational angles of the steering wheel with a threshold value. However, an abnormality in a magneto-resistive element MRE that occurs when there is no power is difficult to detect when the above detection technique is employed. The rotational angle of the steering wheel obtained when the power goes ON serves as a reference for comparison. Thus, it is difficult to readily detect a defective magneto-resistive element MRE if the rotational angle is inaccurate when the power goes ON.

Figure 10:
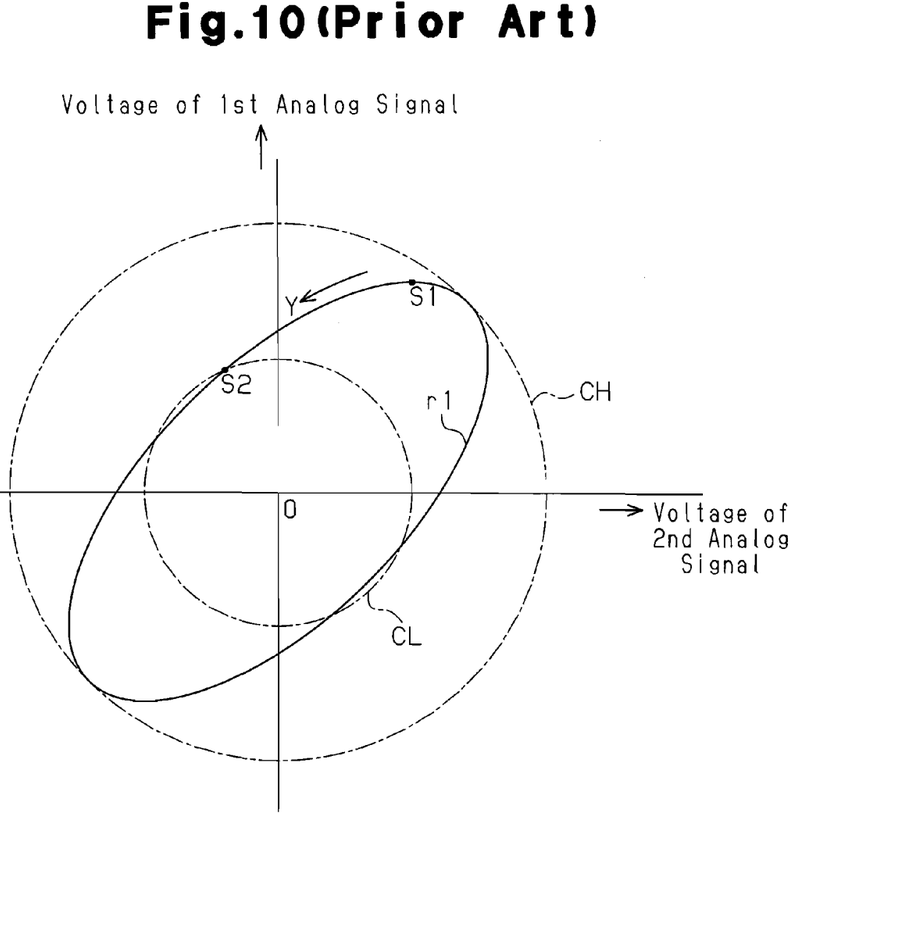
FIG. 10 is a graph used to show the procedures for detecting an abnormality in the prior art.

The rotational angle detector of the prior art plots the values of the first and second analog signals (FIG. 10) output from each magneto-resistive element MRE to detect an abnormality in a magneto-resistive element MRE. FIG. 10 shows a locus r1 obtained by plotting the values of the first and second signals output from a defective magnetic sensor MRE. The locus r1 forms an ellipse. The rotational angle detector of the prior art performs a radius check by comparing the values of the two analog signals output from the magnetic sensor MRE (i.e., the distance of locus r1 from the origin O in an orthogonal coordinate system using the vertical axis for the output values of the first analog signal and the horizontal axis for the output values of the second analog signal, hereinafter referred to as radius value) with an upper limit value CH and a lower limit value CL, which are set in accordance with the magnetic sensor characteristics. The rotational angle detector of the prior art determines that the magnetic sensor MRE is defective if the radius value r1 is greater than the upper limit value CH or smaller than the lower limit value CH. For example, when the steering wheel is located at position S1 as shown in FIG. 10 when the power goes ON, and the steering wheel is rotated in the direction of arrow Y, the rotational angle detector of the prior art detects an abnormality in the magnetic sensor MRE when the steering wheel reaches position S2 at which the radius value r1 is smaller than the lower limit value CL. In other words, during the period the steering wheel is rotated from position S1 to position S2 after the power goes ON, the rotational angle detector of the prior art cannot detect an abnormality that occurred in the magnetic sensor while the power was OFF. Until the steering wheel reaches position S2, the rotational angle detector continues to provide vehicle systems with an erroneous rotational angle.

The present invention provides a rotational angle detector that decreases the rotational angle of the rotor required after the power goes ON to detect an abnormality in a magnetic resistance MRE that occurred when the supply of power was cut.

One aspect of the present invention is a rotational angle detector for detecting the absolute value of a rotational angle of a rotor. The rotational angle detector includes a drive gear integrally rotatable with the rotor. A first driven gear is mated with the drive gear and has teeth. A second driven gear is mated with the drive gear and has a quantity of teeth differing from that of the first driven gear. A first magnetic sensor detects a rotational angle of the first driven gear and outputs a detection signal corresponding to the detected rotational angle. A second magnetic sensor detects a rotational angle of the second driven gear and outputs a detection signal corresponding to the detected rotational angle. A control circuit calculates the rotational angle of the first driven gear based on a first analog signal and a second analog signal corresponding to the detection signal of the first magnetic sensor. The rotational angle of the second driven gear is based on a third analog signal and a fourth analog signal corresponding to the detection signal of the second magnetic sensor. The absolute value of the rotational angle of the rotor is based on the calculated rotational angles of the first and second driven gears. An abnormality detection circuit has an upper threshold value and a lower threshold value. The abnormality detection circuit calculates a radius value r1 for a locus of an output value of the first analog signal and an output value of the second analog signal in an orthogonal coordinate system having two coordinate axes respectively indicating the output values of the first and second analog signals, calculates a radius value r2 for a locus of an output value of the third analog signal and an output value of the fourth analog signal in an orthogonal coordinate system representing an output value of the third analog signal and an output value of the fourth analog signal, calculates the ratio of the radius values r1 and r2, and compares the ratio of the calculated radius values, the upper threshold value, and the lower threshold value to detect an abnormality in the first magnetic sensor or the second magnetic sensor.

A further aspect of the present invention is a rotational angle detector for detecting the absolute value of a rotational angle of a rotor. The rotational angle detector includes a drive gear integrally rotatable with the rotor. A first driven gear is mated with the drive gear and has teeth. A second driven gear is mated with the drive gear and has a quantity of teeth differing from that of the first driven gear. A first magnetic sensor detects a rotational angle of the first driven gear and outputs a detection signal corresponding to the detected rotational angle. A second magnetic sensor detects a rotational angle of the second driven gear and outputs a detection signal corresponding to the detected rotational angle. A controller calculates the rotational angle of the first driven gear based on a first analog signal and a second analog signal corresponding to the detection signal of the first magnetic sensor. The rotational angle of the second driven gear is based on a third analog signal and a fourth analog signal corresponding to the detection signal of the second magnetic sensor. The absolute value of the rotational angle of the rotor is based on the calculated rotational angles of the first and second driven gears. The controller includes an upper threshold value and a lower threshold value, calculates a radius value r1 for a locus of an output value of the first analog signal and an output value of the second analog signal in an orthogonal coordinate system having two coordinate axes respectively indicating the output values of the first and second analog signals, calculates a radius value r2 for a locus of an output value of the third analog signal and an output value of the fourth analog signal in an orthogonal coordinate system representing an output value of the third analog signal and an output value of the fourth analog signal, calculates the ratio of the radius values r1 and r2, and compares the ratio of the calculated radius values, the upper threshold value, and the lower threshold value to detect an abnormality in the first magnetic sensor or the second magnetic sensor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A rotational angle detector according to the preferred embodiment of the present invention will now be discussed.

Figure 1:
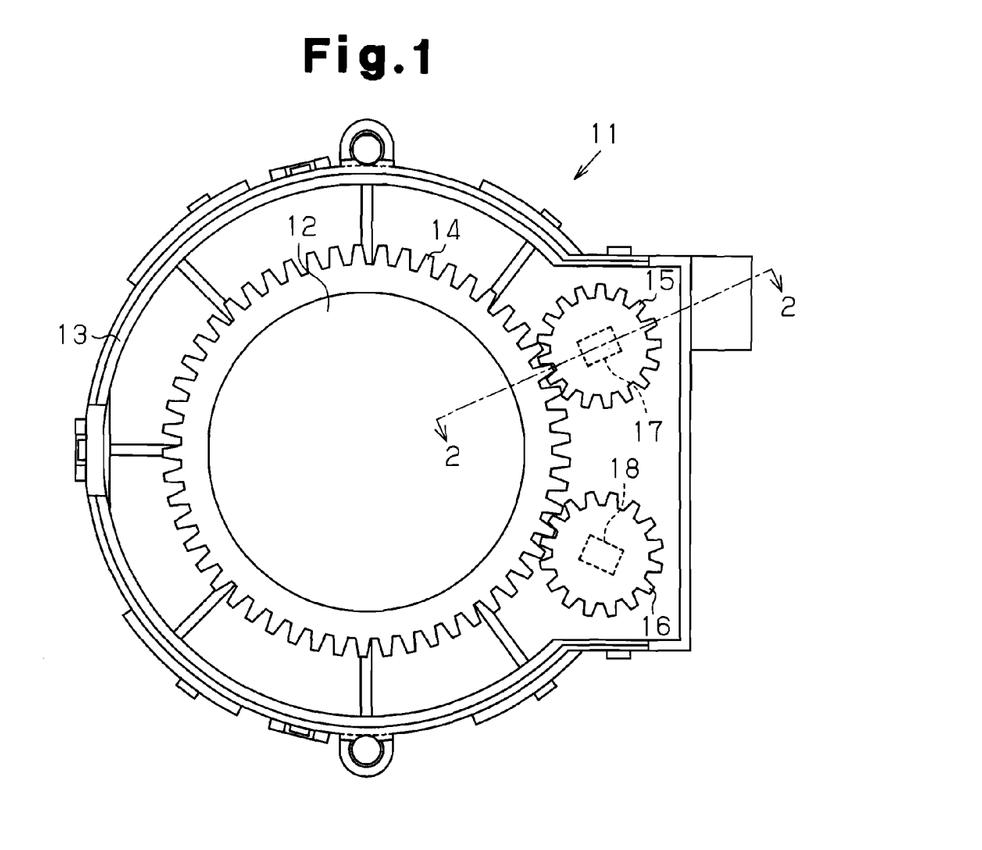
FIG. 1 is a plan view of a rotational angle detector according to a preferred embodiment of the present invention.

FIG. 1 shows a rotational angle detector 11 for detecting the steering angle of a steering wheel. The rotational angle detector 11 is attached to a steering shaft 12. A steering wheel (not shown) is mounted on the steering shaft 12 so as to rotate integrally with the steering shaft 12. The rotational angle detector 11 includes a housing 13. The housing 13 is fixed to a structure such as a steering column that covers the steering shaft 12. A drive gear 14 is fitted to the steering shaft 12 and accommodated in the housing 13. First and second driven gears 15 and 16 are mated with the drive gear 14 and rotatably supported by the housing 13. Rotation of the steering shaft 12 integrally rotates the drive gear 14. This, in turn, rotates the first and second driven gears 15 and 16.

The first and second driven gears 15 and 16 have a different number of teeth. Due to the different number of teeth, the first and second driven gears 15 and 16 have different rotational angles with respect to the rotational angle of the drive gear 14. In the preferred embodiment, the number of teeth for each of the gears 14, 15, and 16 is determined so that the first driven gear 15 is rotated by 180 degrees whenever the drive gear 14 is rotated by 90 degrees, and the second driven gear 16 is rotated by 180 degrees whenever the drive gear 14 is rotated by about 95 degrees (180×54/102).

Figure 2:
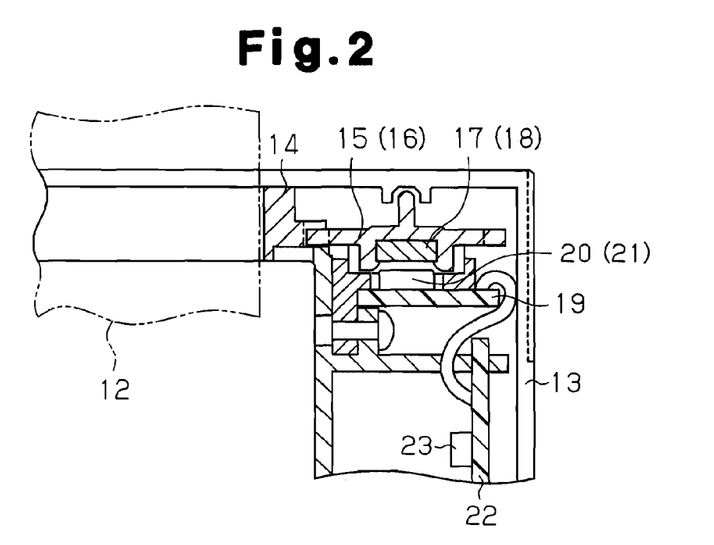
FIG. 2 is a cross-sectional view taken along line 2-2 in FIG. 1.

First and second magnets (permanent magnets) 17 and 18 are arranged on and integrally rotated with the first and second driven gears 15 and 16. As shown in FIG. 2, the first and second magnets 17 and 18 are respectively exposed from openings in lower portions of the driven gears 15 and 16. The magnetic flux of the first and second magnets 17 and 18 shifts directions in accordance with the rotational angles of the first and second driven gears 15 and 16. The magnetic flux of the first and second magnets 17 and 18 rotates 360 degrees as the first and second driven gears 15 and 16 rotate once (360 degrees).

A printed circuit board 19 is arranged below the first and second driven gears 15 and 16. The rotation axes of the first and second driven gears 15 and 16 are orthogonal to the printed circuit board 19. First and second magnetic sensors 20 and 21 are fixed on the upper surface of the printed circuit board 19 so as to face the first and second magnets 17 and 18, respectively. The printed circuit board 19 is electrically connected to another printed circuit board 22. A microcomputer 23 is arranged on the printed circuit board 22.

Figure 3:
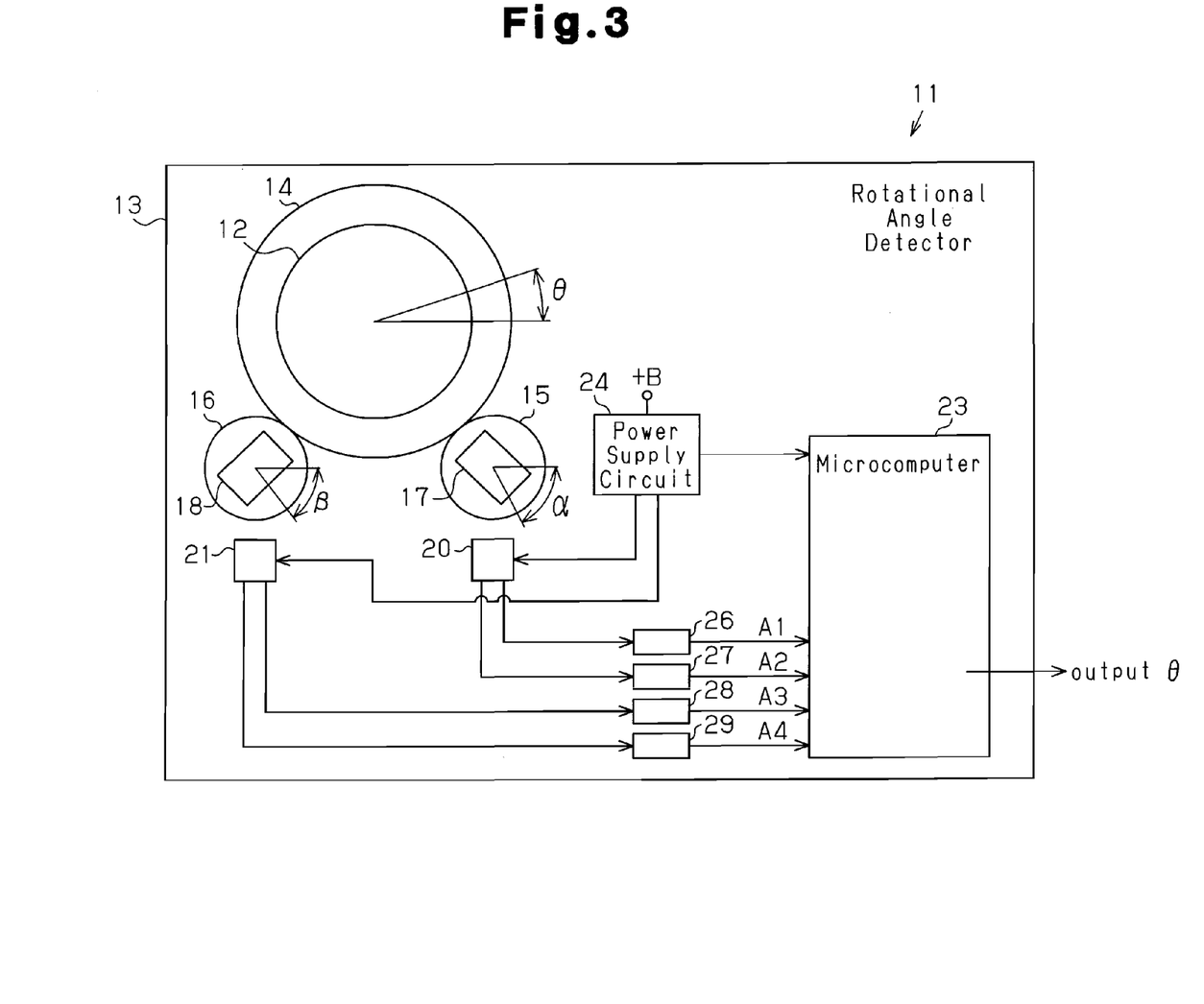
FIG. 3 is a block diagram of the rotational angle detector.

The electrical structure of the rotational angle detector 11 will now be described. As shown in FIG. 3, the rotational angle detector 11 includes the first and second magnetic sensors 20 and 21, the microcomputer 23, a power supply circuit 24, and differential amplifier circuits 26 to 29. The power supply circuit 24 converts voltage (+B) of a vehicle battery (not shown) to a plurality of operation voltages for different parts of the rotational angle detector 11 and stably supplies the operation voltages to each part of the rotational angle detector 11.

The first magnetic sensor 20 will now be described in detail. The second magnetic sensor 21 has substantially the same structure as the first magnetic sensor 20 and thus will not be described.

Figure 4:
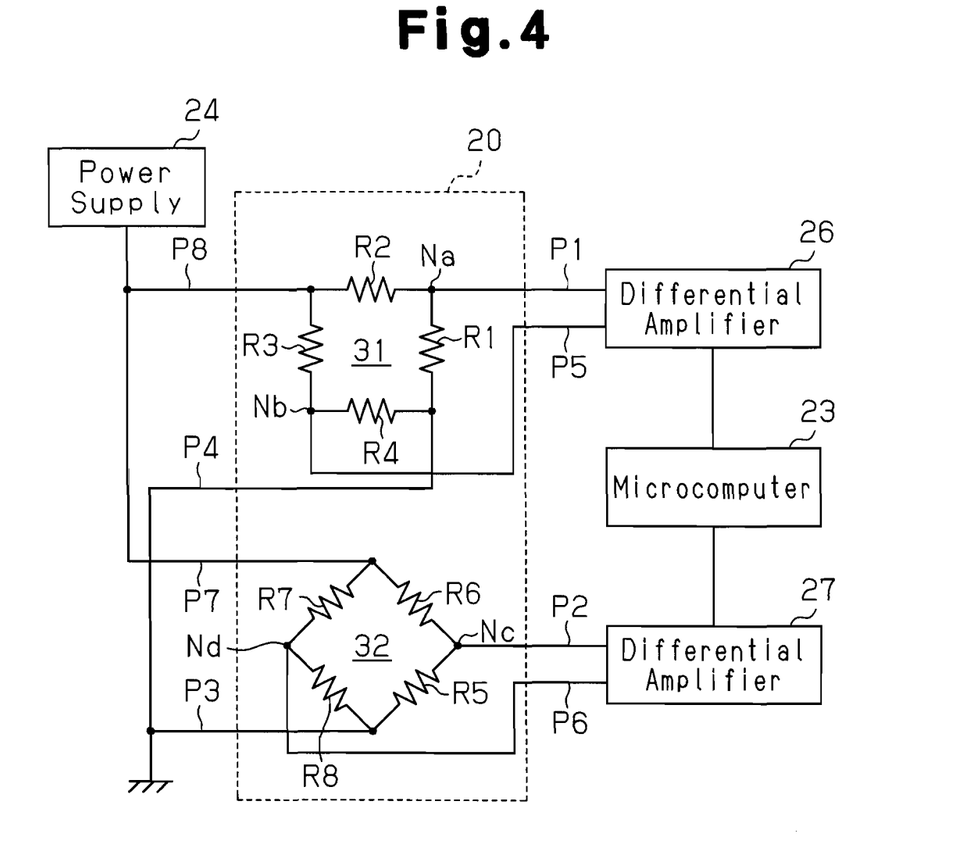
FIG. 4 is a circuit diagram of a magnetic sensor.

As shown in FIG. 4, the first magnetic sensor 20 includes a first bridge circuit 31 and a second bridge circuit 32, which is inclined by 45 degrees relative to the first bridge circuit 31.

The first bridge circuit 31 is configured by magneto-resistive elements R1, R2, R3 and R4. The magneto-resistive element R1 and the magneto-resistive element R2 are connected in series. The magneto-resistive element R3 and the magneto-resistive element R4 are connected in series. The magneto-resistive elements R1 and R2 are connected parallel to the magneto-resistive elements R3 and R4. A node Na between the magneto-resistive element R1 and the magneto-resistive element R2 and a node Nb between the magneto-resistive element R3 and the magneto-resistive element R4 are connected to the first differential amplifier circuit 26.

The second bridge circuit 32 is configured by magneto-resistive elements R5, R6, R7 and R8. The magneto-resistive element R5 and the magneto-resistive element R6 are connected in series. The magneto-resistive element R7 and the magneto-resistive element R8 are connected in series. The magneto-resistive elements R5 and R6 are connected parallel to the magneto-resistive elements R7 and R8. A node Nc between the magneto-resistive element R5 and the magneto-resistive element R6 and a node Nd between the magneto-resistive element R7 and the magneto-resistive element R8 are connected to the second differential amplifier circuit 27.

Figure 5A:
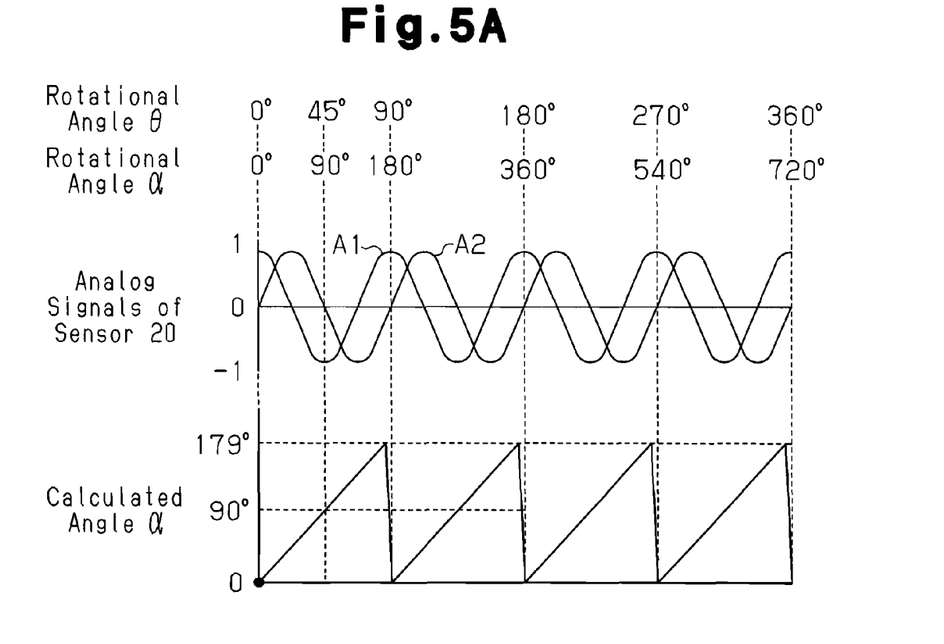
FIGS. 5A and 5B are waveform charts of signals output from a normally functioning magnetic sensor.

The power supply circuit 24 applies voltage having a predetermined level to the first bridge circuit 31 and the second bridge circuit 32. When the magneto-resistive elements R1 to R8 are influenced by an external magnetic field, the resistance of each magneto-resistive element R1 to R8 varies in accordance with the magnetic field (more accurately, the orientation of magnetic flux). The potentials at the nodes Na, Nb, Nc, and Nd vary as the orientation of the magnetic flux of the first magnet 17 shifts when the first driven gear 15 rotates. The first bridge circuit 31 provides the first differential amplifier circuit 26 with each potential at the nodes Na and Nb as a magnetic flux detection signal. The second bridge circuit 32 provides the second differential amplifier circuit 27 with each potential at the nodes Nc and Nd as a magnetic flux detection signal. The first and second differential amplifier circuits 26 and 27 differentially amplify the detection signals and generate a first analog signal A1 and a second analog signal A2. As shown in FIG. 5A, the first analog signal A1 is a sinusoidal signal and the second analog signal A2 is a cosine signal. The first and second analog signal A1 and A2 continuously vary in accordance with the rotational angle α of the first driven gear 15. The first analog signal A1 and the second analog signal A2 are provided to the microcomputer 23.

The first driven gear 15 is rotated by 180 degrees whenever the drive gear 14 is rotated by 90 degrees. Each cycle of the first and second analog signals A1 and A2 corresponds to a 180 degree shift in the magnetic flux orientation of the first driven gear 15. The voltage of the first analog signal A1 output by the first magnetic sensor 20 is the same when the rotational angle α is 0 degrees and 180 degrees. This is the same for the second analog signal A2. Therefore, each cycle of the first and second analog signals A1 and A2 correspond to a 90 degree rotation of the drive gear 14, or a 180 degree rotation of the first driven gear 15.

Figure 9:
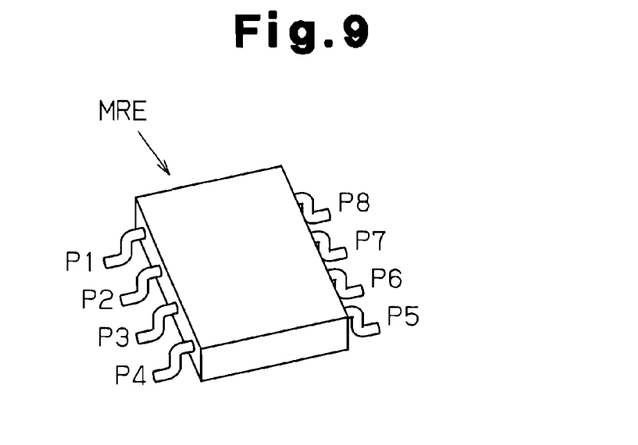
FIG. 9 is a perspective view showing a typical magnetic sensor.

Connection lines P1 to P8 of FIG. 4 respectively correspond to pins P1 to P8 of an IC shown in FIG. 9.

Figure 5B:
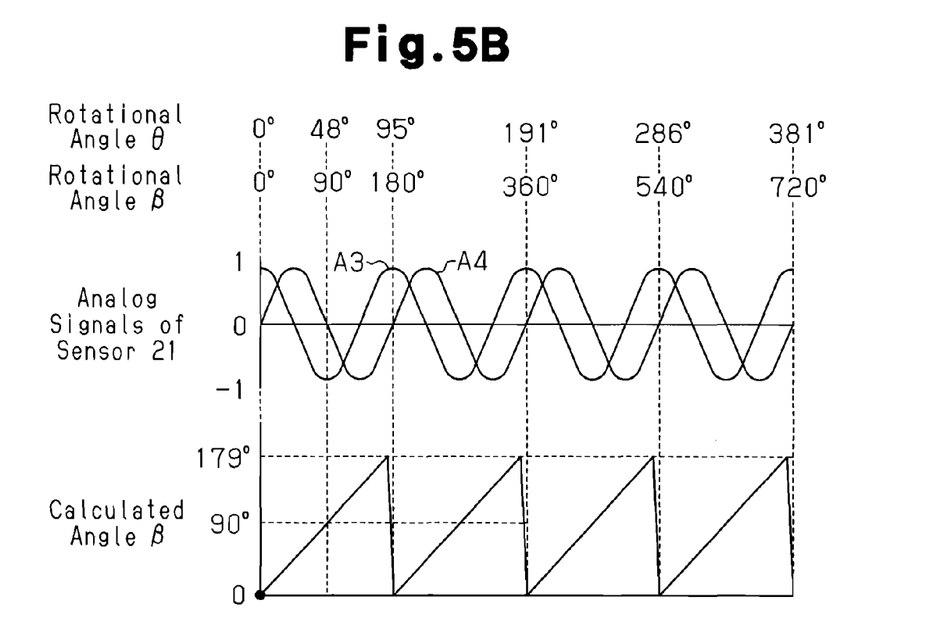

Referring to FIG. 3, in the same manner as the first magnetic sensor 20, the second magnetic sensor 21 provides the third and fourth differential amplifier circuits 28 and 29 with the detection signals corresponding to a shift in the magnetic flux orientation of the second magnet 18 as the second driven gear 16 rotates. The third and fourth differential amplifier circuits 28 and 29 differentially amplifies the detection signals provided from the second magnetic sensor 21 to generate a third analog signal A3 and a fourth analog signal A4. As shown in FIG. 5B, the third analog signal A3 is a sinusoidal signal and the fourth analog signal A4 is a cosine signal. The third and fourth analog signals A3 and A4 continuously vary in accordance with the rotational angle β of the second driven gear 16. The third analog signal A3 and the fourth analog signal A4 are provided to the microcomputer 23.

The second driven gear 16 is rotated by 180 degrees whenever the drive gear 14 is rotated by 95 degrees. Each cycle of the third and fourth analog signals A3 and A4 corresponds to a 180 degree shift in the magnetic flux orientation of the second driven gear 16. The voltage of the third analog signal A3 output by the second magnetic sensor 21 is the same when the rotational angle β is 0 degrees and 180 degrees. This is the same for the fourth analog signal A4. Therefore, each cycle of the third and fourth analog signals A3 and A4 correspond to rotation of about 95 degrees of the drive gear 14, or a 180 degree rotation of the second driven gear 16.

The values of the rotational angle θ of the drive gear 14 in FIG. 5B are values obtained by rounding off the first decimal place to the nearest whole number.

The microcomputer 23 includes a CPU, a ROM, a RAM, and an A/D converter (not shown). The microcomputer 23 calculates the rotational angle α of the first driven gear 15 as shown in FIG. 5A from the combination of the voltages (output values) of the first and second analog signals A1 and A2 received from the first magnetic sensor 20 (first and second differential amplifier circuits 26 and 27). The microcomputer 23 calculates the rotational angle β of the second driven gear 16 as shown in FIG. 5B from the combination of the voltages (output values) of the third and fourth analog signals A3 and A4 received from the second magnetic sensor 21 (third and fourth differential amplifier circuits 28 and 29). The microcomputer 23 calculates the rotational angle θ of the drive gear 14 based on the calculated rotational angles α and β and provides the calculated rotational angle θ of the drive gear 14 to various vehicles systems (e.g., vehicle stability control system and electronic control suspension system).

In the preferred embodiment, the rotation cycle of the second driven gear 16 is longer than the rotation cycle of the first driven gear 15. Therefore, when the steering wheel is rotated from a reference position (steering wheel rotation angle of 0 degrees) at which the rotational angle α of the first driven gear 15 and the rotational angle β of the second driven gear 16 are both 0 degrees, the value of "α-β" changes linearly in accordance with the steering wheel angle. Accordingly, the rotational angle θ of the steering wheel within one cycle can be determined from the value of "α-β".

Procedures for detecting an abnormality in a magnetic sensor will now be discussed.

When the steering wheel is rotated during the period the power (vehicle ignition switch IG) is ON, the microcomputer 23 calculates the rotational angle θ of the drive gear 14, provides the rotational angle θ to various vehicle systems, and stores the rotational angle θ in a memory (not shown) as "previous rotational angle θ". The next time the steering wheel is rotated when the power is ON, the microcomputer 23 calculates the rotational angle θ of the drive gear 14 once more. The microcomputer 23 calculates the difference between the present rotational angle θ and the previous rotational angle θ, which is stored in the memory, and compares the difference with a preset threshold value. The microcomputer 23 determines that either one of the first or the second magnetic sensor 20 and 21 is abnormal if the difference is greater than the threshold value. The microcomputer 23 activates a notification device such as an indicator or a buzzer arranged in an installment panel (not shown) to notify the vehicle occupant of the occurrence of an abnormality. An example of the threshold value is the varied amount of the rotational angle θ when the steering wheel is rotated as fast as possible.

An abnormality of the magnetic sensor that occurs during a period in which there is no power is difficult to detect based on the difference from the previous rotational angle θ. In this case, the rotational angle θ calculated when the power goes ON is inaccurate. Nevertheless, this rotational angle θ is stored as the previous rotational angle θ.

The detection of an abnormality in the magnetic sensor that occurs when the power is OFF will now be discussed. A case in which either one of the first magnetic sensor 20 and the second magnetic sensor 21 has an abnormality (e.g., short circuiting of pin P1 with pin P2 in the first magnetic sensor 20) when the power if OFF will be described.

Figure 6:
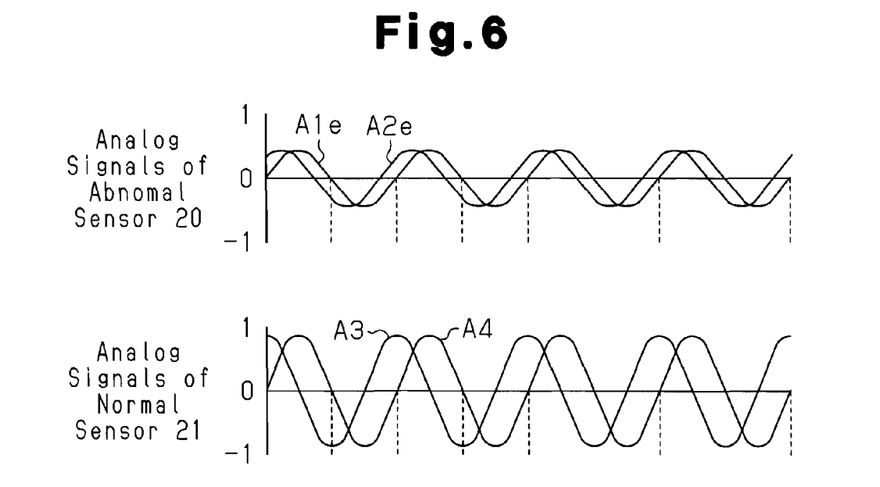
FIG. 6 is a waveform chart of signals output from a defective magnetic sensor.

In a state in which the first magnetic sensor 20 is abnormal, when the power goes ON and the steering wheel is rotated, the analog signals A1 to A4 of the first and second magnetic sensors 20 and 21 are provided to the microcomputer 23. The second magnetic sensor 21, which is functioning normally, generates normal third and fourth analog signals A3 and A4, as shown in FIG. 6. However, the first magnetic sensor 20, which is not functioning normally, generates erroneous first and second analog signals A1e and A2e, which have a small amplitude and a deviated phase. Therefore, the rotational angle of the first driven gear 15 calculated by the microcomputer 23 is not the normal rotational angle α and is an inaccurate angle αe containing error. Accordingly, the rotational angle of the drive gear 14, which is calculated from the rotational angle αe and the rotational angle β by the microcomputer 23, is not the normal rotational angle θ and is an incorrect angle θe containing error.

The error between the incorrect rotational angle θe detected in an abnormal state and the correct rotational angle θ detected in a normal state will now be described. The vertical axis of FIG. 7 indicates the error between the rotational angles θe and θ. The error forms a waveform generally resembling a cosine curve that fluctuates in 45 degree cycles. In the preferred embodiment, when the error is 2.7 degrees or greater or −2.7 degrees or less, the calculated rotational angle θe deviates significantly from the actual rotational angle due to an algorism of the magnetic sensor. For example, the rotational angle θe of the drive gear 14 in an abnormal state may be calculated as a value obtained by adding or subtracting the angle corresponding to one cycle of the detection signal, that is, the angle (90 degrees) corresponding to one cycle of the first and second analog signals A1 and A2 in the first magnetic sensor 20. If the abnormality of the magnetic sensor continues to be undetected, the microcomputer 23 continues to provide the vehicle systems with the rotational angle θe, which is significantly deviated from the normal value, as the normal value. A process for detecting the abnormality of the magnetic sensor at an early stage to resolve such a drawback is performed in the preferred embodiment.

When calculating the rotational angle θ e of the drive gear 14, the microcomputer 23 also calculates radius values r1 and r2 from the voltages of the analog signals A1, A2, A3, and A4 in the same cycle using the following equation. Then, the microcomputer 23 compares the radius values r1 and r2 with an upper limit value CH and a lower limit value CL, which are determined in accordance with the characteristics property of the magnetic sensors 20 and 21.

$$r1 = \sqrt{(\text{voltage of first analog signal } A1e)^2 + (\text{voltage of second analog signal } A2e)^2}$$

$$r2 = \sqrt{(\text{voltage of third analog signal } A3)^2 + (\text{voltage of fourth analog signal } A4)^2}$$

The radius values r1 and r2 are substantially the same if the corresponding magnetic sensors 20 and 21 are normal. The microcomputer 23 determines that the corresponding magnetic sensors 20 and 21 are abnormal if the radius values r1 and r2 are greater than the upper limit value CH or smaller than the lower limit value CL. This process may be referred to as individual output value check or radius check conducted on each magnetic sensor.

Figure 8:
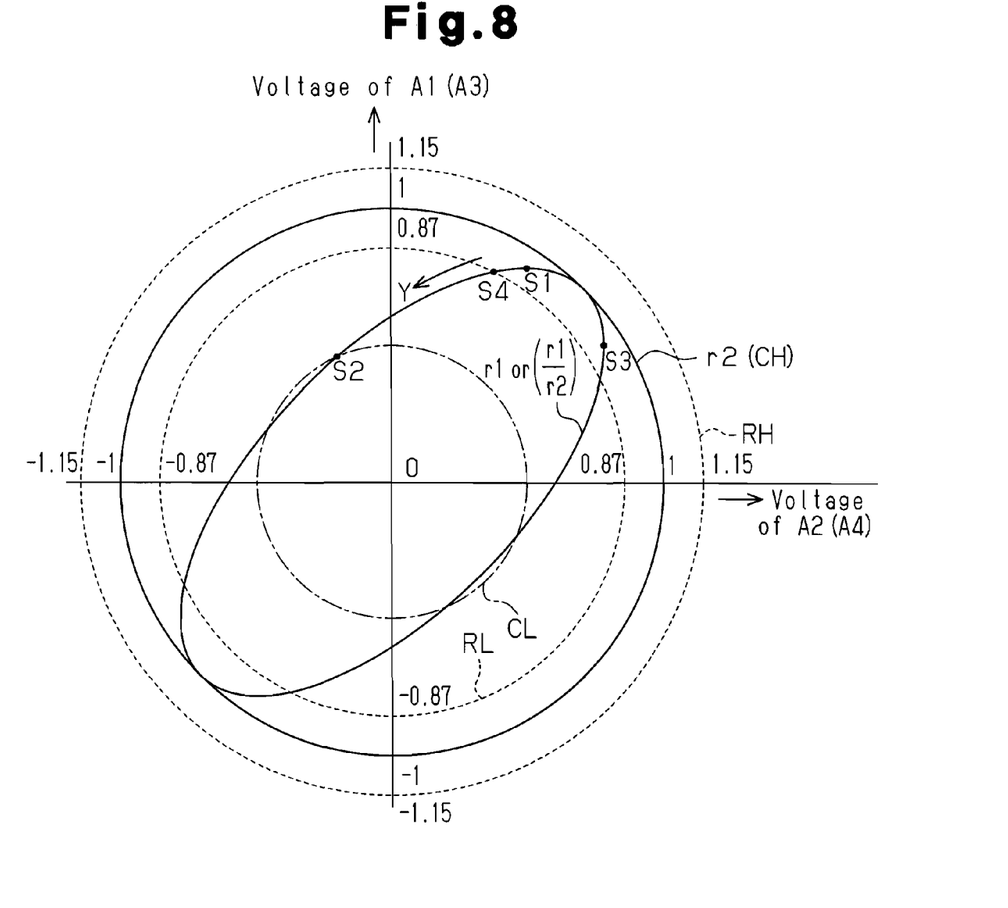
FIG. 8 is a graph used to show the procedures for detecting an abnormality.

FIG. 8 shows a locus r1 of the voltages of the first and second analog signals A1 and A2 generated by the first magnetic sensor 20 during one cycle and plotted in an orthogonal coordinate system in which the voltages of the first and second analog signals A1 and A2 are respectively indicated by the vertical axis and the horizontal axis. FIG. 8 also shows a locus r2 for of the voltages of the third and fourth analog signals A3 and A4 generated by the second magnetic sensor 21 during one cycle and plotted in an orthogonal coordinate system in which the voltages of the third and fourth analog signals A3 and A4 are respectively indicated by the vertical axis and the horizontal axis. The radius values r1 and r2 indicate the distances from the origin O to the loci r1, r2, respectively.

The second magnetic sensor 21 is functioning normally. Thus, the radius value r2 is substantially constant, and the locus r2 is more or less a perfect circle. The radius value r1 continuously varies in the abnormal first magnetic sensor 20. Thus, the locus r1 forms an ellipse. Circles formed by the upper limit value CH, which is overlapped with the locus r2, and the lower limit value CL are also shown in FIG. 8.

As for the second magnetic sensor 21, the microcomputer 23 determines that the second magnetic sensor 21 is functioning normally since the radius value r2 is always equal to the upper limit value CH.

Figure 7:
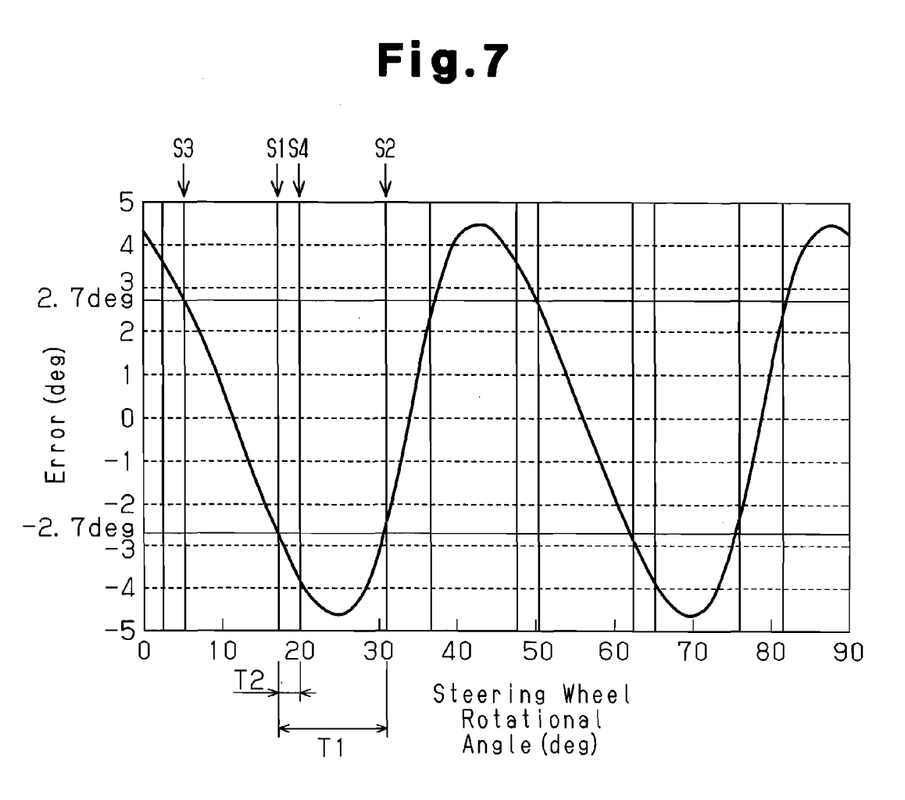
FIG. 7 is a chart showing errors in the angle detected by a defective magnetic sensor.

The microcomputer 23 determines that the first magnetic sensor 20 is abnormal if the radius value r1 is smaller than the lower limit value CL. For example, if the steering wheel is located at position S1 when the power goes ON and then rotated in the direction of arrow Y, the microcomputer 23 detects an abnormality in the first magnetic sensor 20 at the point the radius value r1 becomes smaller than the lower limit value CL, that is, at the point the steering wheel reaches position S2. Referring to FIG. 7, if the power goes ON when the steering wheel is located at position S1, at which a significant deviation has occurred as described above, and the steering wheel is then rotated, an abnormality in the magnetic sensor is detected when the steering wheel reaches position S2 at which the significant deviation occurs next. Under such circumstances, the rotational angle required for the steering wheel until the abnormality is detected from when the power goes ON (period T1 in FIG. 7) is 13.3 degrees. That is, under the above circumstances, an abnormality in the magnetic sensor is detected when the steering wheel is rotated by 13.3 degrees to position S2 from position S1 during the radius check. Since a significant deviation does not occur during the period the steering wheel is located between position S3 and position S1, the rotational angle $\theta e$, which contains an error from the rotational angle $\theta$, is output as a substantially normal value.

The microcomputer 23 performs a radius ratio check as described below in addition to the radius check to detect an abnormality in a magnetic sensor that occurs when the power is OFF.

In the radius ratio check, the microcomputer 23 calculates the ratio r1/r2 for the radius values r1 and r2, and compares the ratio r1/r2 with a predetermined lower threshold value RL and a predetermined upper threshold value RH. The microcomputer 23 determines that the magnetic sensors 20 and 21 are both normal if the value of r1/r2 is between the lower threshold value RL and the upper threshold value RH. The microcomputer 23 determines that the first magnetic sensor 20 is abnormal if the r1/r2 is smaller than the lower threshold value RL, that is, when the radius value r1 is small. The microcomputer 23 determines that the second magnetic sensor 21 is abnormal if the r1/r2 is greater than the upper threshold value RH, that is, when the radius value r2 is small. The microcomputer 23 includes an abnormality detection circuit for continuously monitoring the ratio of the output values of the magnetic sensors and detecting the abnormality of the magnetic sensor.

The locus of the ratio r1/r2, which overlaps the locus of radius value r1 since radius value r2 is 1, for one cycle, a circle formed by the lower threshold value RL, and a circle formed by the upper threshold value RH are shown in FIG. 8. The lower threshold value RL and the upper threshold value RH are set to "0.87" and "1.15", respectively. The rotational angle of the steering wheel required from when the power goes ON for an abnormality to be detected may be changed in accordance with the setting of the lower threshold value RL and the upper threshold value RH.

The radius ratio check will now be described. In FIG. 8, if the steering wheel is located at position S1 when the power goes ON and then rotated in the direction of the arrow Y, an abnormality in the first magnetic sensor 20 is detected at position S4, at which the ratio r1/r2 of the radius values becomes smaller than the lower threshold value RL during the radius ratio check. In this case, the rotational angle (period T2 in FIG. 7) of the steering wheel required from when the power goes ON for detection of an abnormality is 3.0 degrees. That is, under the above circumstances, an abnormality in the magnetic sensor is detected when the steering wheel is rotated by 3.0 degrees from position S1 to position S4 during the radius ratio check.

The length of the period T2 (period T1-period T2) may be changed in accordance with the setting of the lower threshold value RL and the upper threshold value RH. For example, the period T2 becomes longer as the difference between the lower threshold value RL and the upper threshold value RH increases. This increases the rotational angle of the steering wheel that is required from when the power goes ON to detect an abnormality. On the other hand, the period T2 becomes shorter as the difference between the lower threshold value RL and the upper threshold value RH decreases. This decreases the rotational angle of the steering wheel that is required from when the power goes ON to detect an abnormality.

When an abnormality of the magnetic sensor is detected through either one of the radius check and the radius check ratio check, the microcomputer 23 activates a notification device, such as an indicator or a buzzer arranged in an installment panel (not shown), and notifies the vehicle occupant of the abnormality in the magnetic sensor. When an abnormality in the magnetic sensor is detected, the microcomputer 23 provides a prohibition signal to the vehicle systems, which execute control based on the rotational angle of the steering shaft, to prohibit the control of the vehicle systems.

The preferred embodiment has the advantages described below.

(1) In the preferred embodiment, the microcomputer 23 performs a radius ratio check to compare the radius (r1/r2) of the radius values r1 and r2 with the lower threshold value RL and the upper threshold value RH. An abnormality in one of the two magnetic sensors, such as short circuiting of pins in the first magnetic sensor 20, is detected based on the other one of the magnetic sensors, which is functioning normally (e.g., second magnetic sensor 21), the lower threshold value RL, and the upper threshold value RH.

The lower threshold value RL and the upper threshold value RH of the radius ratio check are respectively set to "0.87" and "1.15". This reduces the rotational angle of the steering wheel required in the radius check to detect an abnormality in a magnetic sensor from 13.3 degrees to 3.0 degrees. Therefore, after the power goes ON, the steering wheel is required be rotated only slightly to detect an abnormality in the magnetic sensor that occurred when the power was OFF. Further, the one of the first magnetic sensor 20 and the second magnetic sensor 21 that is abnormal is determined based on the value of the ratio r1/r2 of the radius values. Moreover, the lower threshold value RL and the upper threshold value RH are set irrespective of the maximum voltage of each analog signal A1 to A4. Thus, the lower threshold value RL and the upper threshold value RH are commonly used even if the maximum voltage for each of the analog signals A1 to A4 changes.

(2) In the preferred embodiment, the microcomputer 23 not only activates a notification device, such as an indicator or a buzzer arranged in an installment panel (not shown), to notify the vehicle occupant of an abnormality in a magnetic sensor, but also provides a prohibition signal to vehicle systems, which execute controls using the rotational angle of the steering shaft, to prohibit control by the vehicle systems when an abnormality in a magnetic sensor is detected during the radius ratio check. This prevents vehicle systems from executing control that is based on the erroneous rotational angle $\theta e$ of the drive gear 14.

It should be apparent to those skilled in the art that the present invention may be embodied in many other specific forms without departing from the spirit or scope of the invention. Particularly, it should be understood that the present invention may be embodied in the following forms.

In the preferred embodiment, the microcomputer 23 detects the rotational angle $\theta$ of the drive gear 14 and an abnormality in the magnetic sensor. However, an abnormality detection circuit for performing the radius ratio check to detect an abnormality in a magnetic sensor may be provided in addition to the microcomputer 23.

The microcomputer 23 performs both the radius ratio check and the radius check in the preferred embodiment, but does not need to perform the radius check.

The lower threshold value RL and the upper threshold value RH are not limited to the values of the preferred embodiment. The rotational angle of the steering wheel required from when the power goes ON to the detect an abnormality during the radius ratio check may be reduced by decreasing the difference between the lower threshold value RL and the upper threshold value RH. However, if the difference between the lower threshold value RL and the upper threshold value RH is too small, this may increase the possibility of an abnormal condition being detected due to noise or a detection error.

The ratio of the number of teeth in the drive gear 14, the first driven gear 15, and the second driven gear 16 is not limited to the values of the preferred embodiment.

The present examples and embodiments are to be considered as illustrative and not restrictive, and the invention is not to be limited to the details given herein, but may be modified within the scope and equivalence of the appended claims.

What is claimed is:

1. A rotational angle detector for detecting an absolute value of a rotational angle of a rotor, the rotational angle detector comprising:
   a drive gear integrally rotatable with the rotor;
   a first driven gear mated with the drive gear and having teeth,
   a second driven gear mated with the drive gear and having a quantity of teeth differing from that of the first driven gear;
   a first magnetic sensor for detecting a rotational angle of the first driven gear and outputting a detection signal corresponding to the detected rotational angle;
   a second magnetic sensor for detecting a rotational angle of the second driven gear and outputting a detection signal corresponding to the detected rotational angle;
   a control circuit for calculating the rotational angle of the first driven gear based on a first analog signal and a second analog signal corresponding to the detection signal of the first magnetic sensor, the rotational angle of the second driven gear based on a third analog signal and a fourth analog signal corresponding to the detection signal of the second magnetic sensor, and the absolute value of the rotational angle of the rotor based on the calculated rotational angles of the first and second driven gears; and
   an abnormality detection circuit having an upper threshold value and a lower threshold value, wherein the abnormality detection circuit:
   calculates a radius value r1 for a locus of an output value of the first analog signal and an output value of the second analog signal in an orthogonal coordinate system having two coordinate axes respectively indicating the output values of the first and second analog signals;
   calculates a radius value r2 for a locus of an output value of the third analog signal and an output value of the fourth analog signal in an orthogonal coordinate system representing an output value of the third analog signal and an output value of the fourth analog signal;
   calculates the ratio of the radius values r1 and r2; and
   compares the ratio of the calculated radius values, the upper threshold value, and the lower threshold value to detect an abnormality in the first magnetic sensor or the second magnetic sensor.

2. The rotational angle detector according to claim 1, wherein the radius r1 is calculated in accordance with equation 1 and the radius r2 is calculated in accordance with equation 2, in which equation 1 is:

$$r1 = \sqrt{(\text{voltage of first analog signal})^2 + (\text{voltage of second analog signal})^2};$$

and equation 2 is:

$$r2 = \sqrt{(\text{voltage of third analog signal})^2 + (\text{voltage of fourth analog signal})^2}.$$

3. The rotational angle detector according to claim 1, wherein the abnormality detection circuit,
   continuously monitors the ratio of the radius values during a period in which the rotational angle detector is ON;
   determines that the first magnetic sensor has an abnormality when the ratio reaches the lower threshold value; and
   determines that the second magnetic sensor has an abnormality when the ratio reaches the upper threshold value.

4. A rotational angle detector for detecting an absolute value of a rotational angle of a rotor, the rotational angle detector comprising:
   a drive gear integrally rotatable with the rotor;
   a first driven gear mated with the drive gear and having teeth,
   a second driven gear mated with the drive gear and having a quantity of teeth differing from that of the first driven gear;
   a first magnetic sensor for detecting a rotational angle of the first driven gear and outputting a detection signal corresponding to the detected rotational angle;
   a second magnetic sensor for detecting a rotational angle of the second driven gear and outputting a detection signal corresponding to the detected rotational angle; and
   a controller for calculating the rotational angle of the first driven gear based on a first analog signal and a second analog signal corresponding to the detection signal of the first magnetic sensor, the rotational angle of the second driven gear based on a third analog signal and a fourth analog signal corresponding to the detection signal of the second magnetic sensor, and the absolute value of the rotational angle of the rotor based on the calculated rotational angles of the first and second driven gears, wherein the controller:
   includes an upper threshold value and a lower threshold value;
   calculates a radius value r1 for a locus of an output value of the first analog signal and an output value of the second analog signal in an orthogonal coordinate system having two coordinate axes respectively indicating the output values of the first and second analog signals;
   calculates a radius value r2 for a locus of an output value of the third analog signal and an output value of the fourth analog signal in an orthogonal coordinate system representing an output value of the third analog signal and an output value of the fourth analog signal;

calculates the ratio of the radius values r1 and r2; and compares the ratio of the calculated radius values, the upper threshold value, and the lower threshold value to detect an abnormality in the first magnetic sensor or the second magnetic sensor.

5. The rotational angle detector according to claim 4, wherein the radius r1 is calculated in accordance with equation 1 and the radius r2 is calculated in accordance with equation 2, in which equation 1 is:

$$r1 = \sqrt{(\text{voltageoffirstanalogsignal})^2 + (\text{voltageofsecondanalogsignal})^2};$$

and equation 2 is:

$$r2 = \sqrt{(\text{voltageofthirdanalogsignal})^2 + (\text{voltageoffourthanalogsignal})^2}.$$

6. The rotational angle detector according to claim 4, wherein the controller, continuously monitors the ratio of the radius values during a period in which the rotational angle detector is ON;

determines that the first magnetic sensor has an abnormality when the ratio reaches the lower threshold value; and determines that the second magnetic sensor has an abnormality when the ratio reaches the upper threshold value.

* * * * *